(12) United States Patent
Tamura et al.

(10) Patent No.: US 11,150,221 B2
(45) Date of Patent: Oct. 19, 2021

(54) SENSOR SYSTEM

(71) Applicants: Inductosense Limited, Bristol (GB); University of Bristol, Bristol (GB); Hitachi-GE Nuclear Energy, Ltd., Hitachi (JP)

(72) Inventors: Akinori Tamura, Tokyo (JP); Satoshi Kanno, Hitachi (JP); Paul Wilcox, Bristol (GB); Anthony Croxford, Bristol (GB); Chenghuan Zhong, Bristol (GB)

(73) Assignees: Inductosense Limited, Bristol (GB); University of Bristol, Bristol (GB); Hitachi-GE Nuclear Energy, Ltd., Hitachi (JP)

( * ) Notice: Subject to any disclaimer, the term of this patent is extended or adjusted under 35 U.S.C. 154(b) by 232 days.

(21) Appl. No.: 16/612,951

(22) PCT Filed: May 24, 2018

(86) PCT No.: PCT/JP2018/020043
§ 371 (c)(1),
(2) Date: Nov. 12, 2019

(87) PCT Pub. No.: WO2018/225525
PCT Pub. Date: Dec. 13, 2018

(65) Prior Publication Data
US 2020/0158690 A1   May 21, 2020

(30) Foreign Application Priority Data
Jun. 8, 2017   (JP) .............................. JP2017-113171

(51) Int. Cl.
*G01N 29/04*   (2006.01)
*G01N 21/17*   (2006.01)
(Continued)

(52) U.S. Cl.
CPC ......... *G01N 29/04* (2013.01); *G01N 21/1702* (2013.01); *G01N 21/954* (2013.01); *G01N 29/2418* (2013.01)

(58) Field of Classification Search
CPC .............. G01N 29/04; G01N 29/2418; G01N 21/1702; G01N 21/954
See application file for complete search history.

(56) References Cited

U.S. PATENT DOCUMENTS

| 2017/0153108 A1 | 6/2017 | Kitazawa et al. |
| 2017/0214274 A1* | 7/2017 | Zhong ..................... H02J 50/90 |
| 2018/0217106 A1 | 8/2018 | Zhong et al. |

FOREIGN PATENT DOCUMENTS

| GB | 2523266 A | 8/2015 |
| JP | 2016-1136 A | 1/2016 |

(Continued)

OTHER PUBLICATIONS

International Search Report (PCT/ISA/210) issued in PCT Application No. PCT/JP2018/020043 dated Jul. 31, 2018 with English translation (four (4) pages).

(Continued)

*Primary Examiner* — Tarun Sinha
(74) *Attorney, Agent, or Firm* — Crowell & Moring LLP

(57) ABSTRACT

Provided is a sensor system which can detect a thickness reduction, a crack, or the like of a pipe or a container covered with a thick coating member through ultrasonic inspection without attachment and detachment of the coating member. A sensor system used for nondestructive inspection includes a sensor attached to a surface of an inspection target, a sensor coil that is electrically connected to the sensor via a first cable, a first electromagnetic wave blocking member that is disposed between the surface of the inspection target and the sensor coil, a sensor side coil that is disposed to face the sensor coil with a gap and is coupled to the sensor coil (Continued)

through electromagnetic induction, and a probe side coil that is disposed to be separated from the sensor side coil and is electrically connected to the sensor side coil via a second cable.

20 Claims, 10 Drawing Sheets

(51) Int. Cl.
*G01N 21/954* (2006.01)
*G01N 29/24* (2006.01)

(56) References Cited

FOREIGN PATENT DOCUMENTS

| | | |
|---|---|---|
| JP | 2017-96857 A | 6/2017 |
| WO | WO 2016/009174 A1 | 1/2016 |
| WO | WO 2016/207604 A1 | 12/2016 |

OTHER PUBLICATIONS

Japanese-language Written Opinion (PCT/ISA/237) issued in PCT Application No. PCT/JP2018/020043 dated Jul. 31, 2018 (three (3) pages).

Jang et al., "Structural Health Monitoring of A Cable-Stayed Bridge Using Smart Sensor Technology: Deployment and Evaluation", Smart Structures and Systems, 2010, pp. 439-459, vol. 6, No. 5 and 6, (21 pages).

Cegla et al., "Ultrasonic Monitoring of Pipeline Wall Thickness with Autonomous, Wireless Sensor Networks", Oil and Gas Pilelines: Integrity and Safety Handbook, 2015, (10 pages).

Yamaga et al., "Thickness Measuring Technology for Pipes of Thermal Power Plants", Toshiba Review, 2008, pp. 41-44, vol. 63, No. 4, with English abstract, (four (4) pages).

Zhong et al., "Investigation of Inductively Coupled Ultrasonic Transducer System for NDE", IEEE Transactions on Ultrasonics, Ferroelectrics, and Frequency Control, 2013, pp. 1115-1125, vol. 60, No. 6, (11 pages).

\* cited by examiner

[Fig. 1]
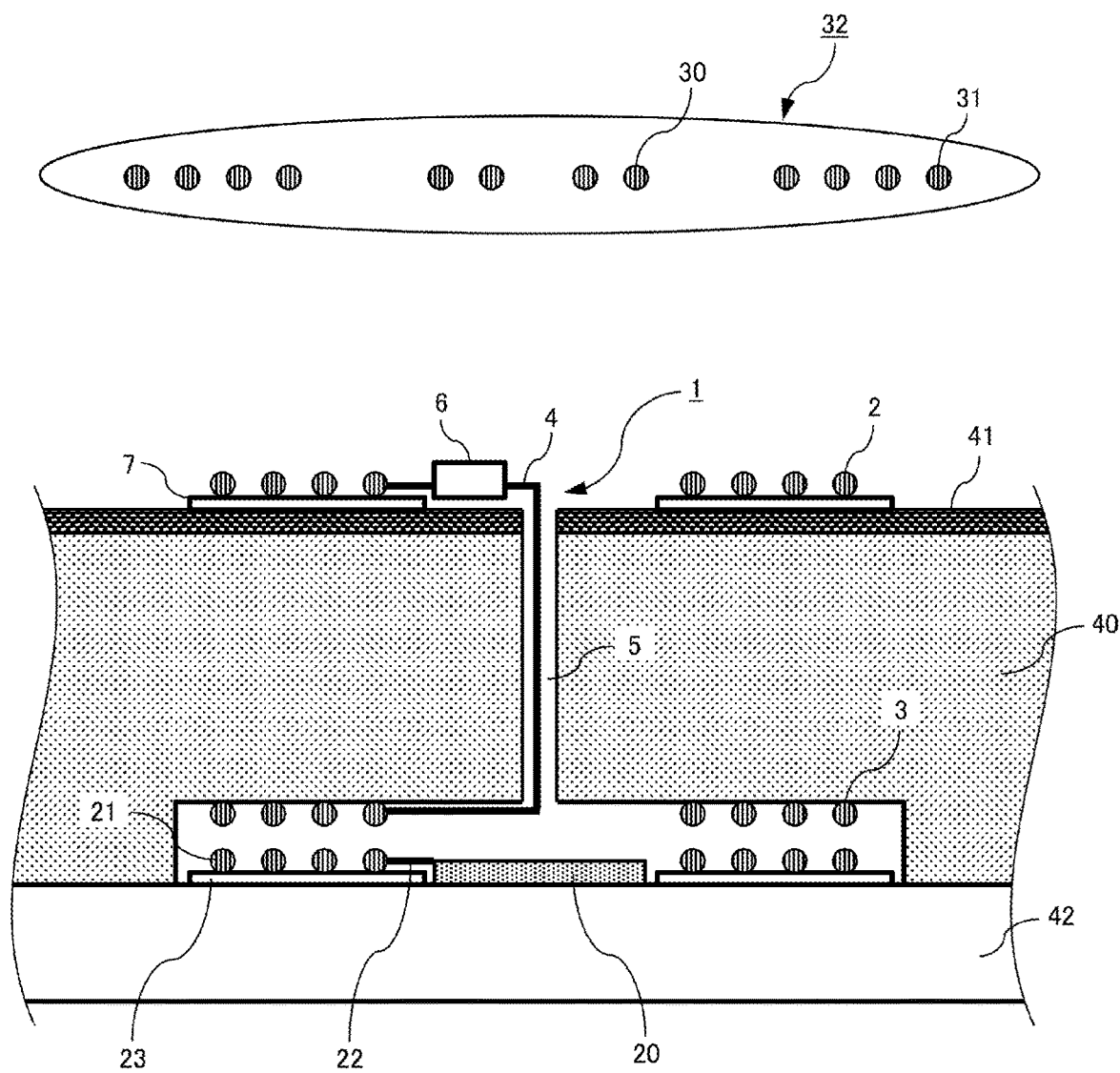

[Fig. 2]
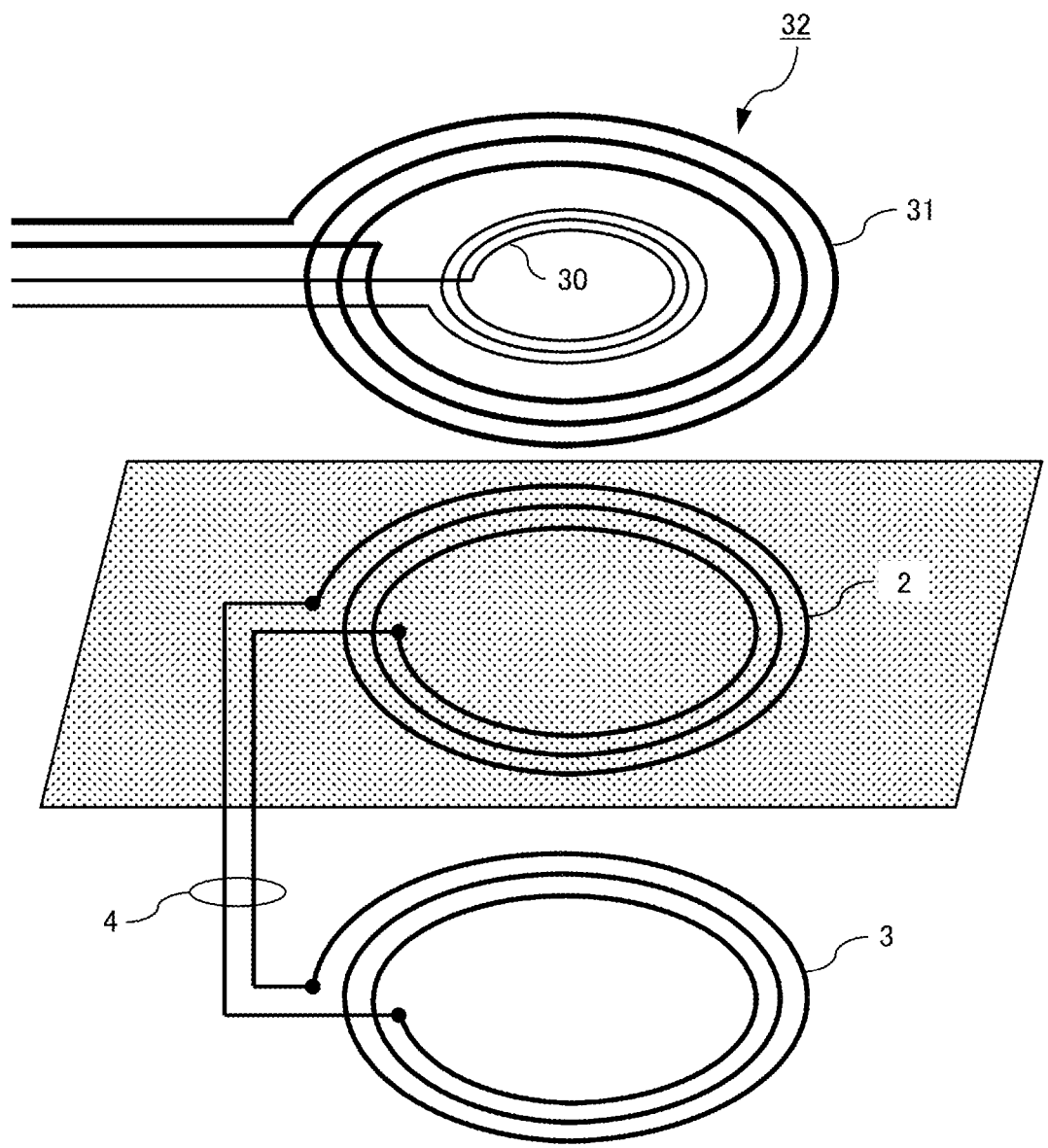

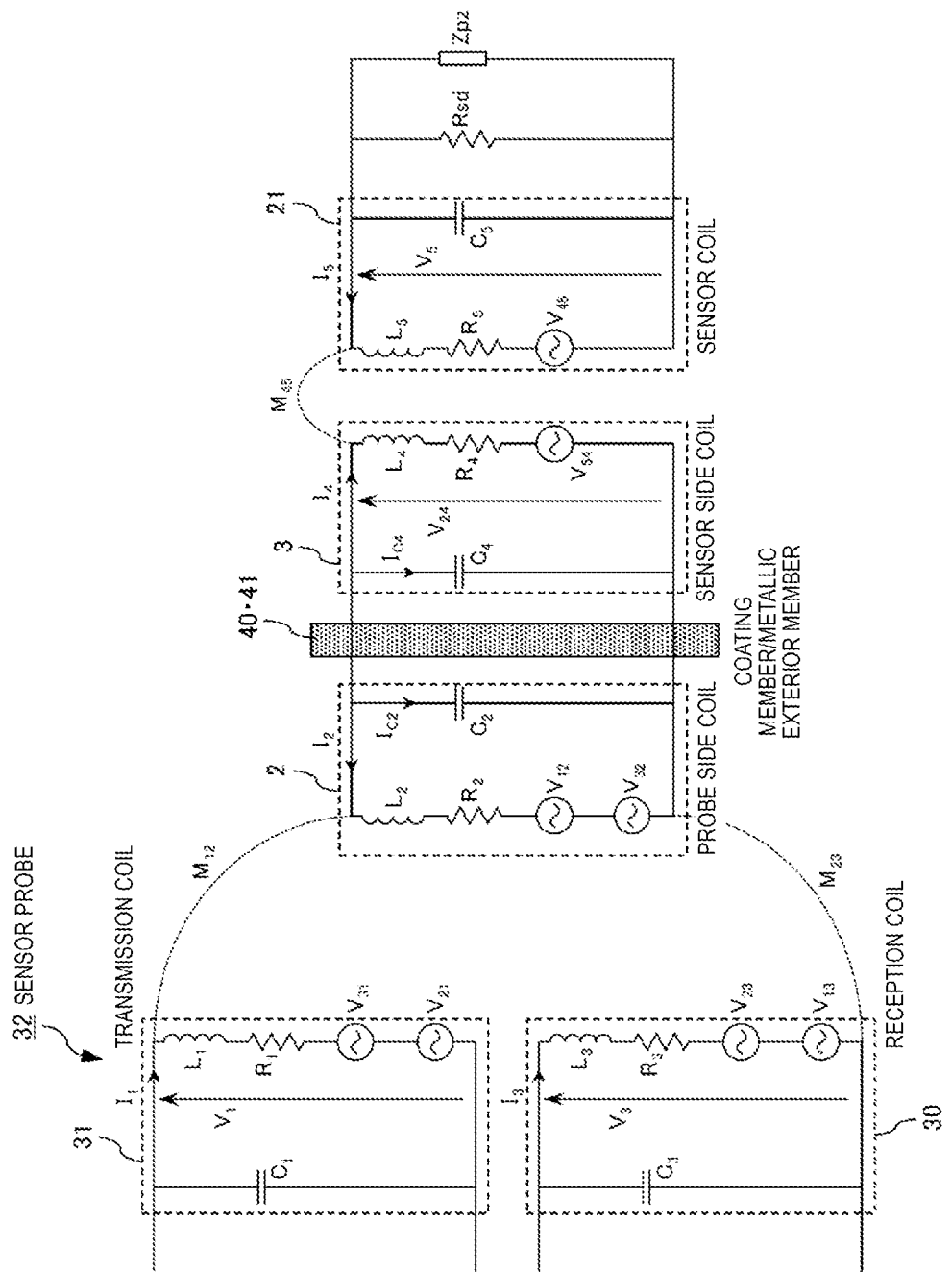
[Fig. 3]

[Fig. 4]
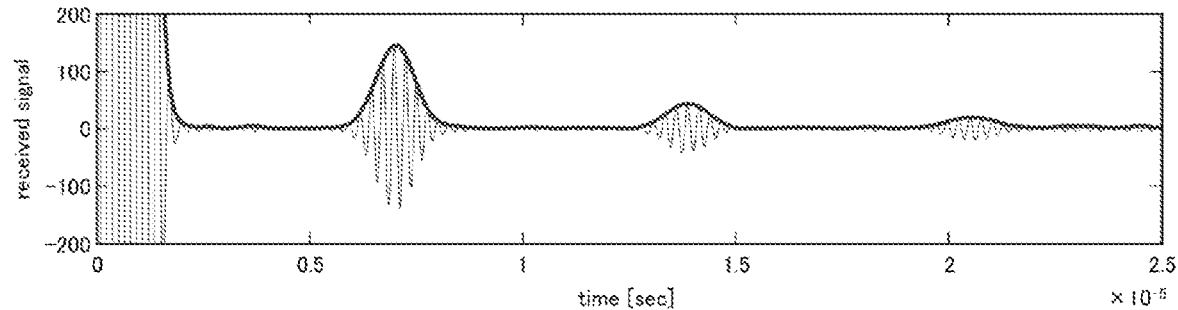
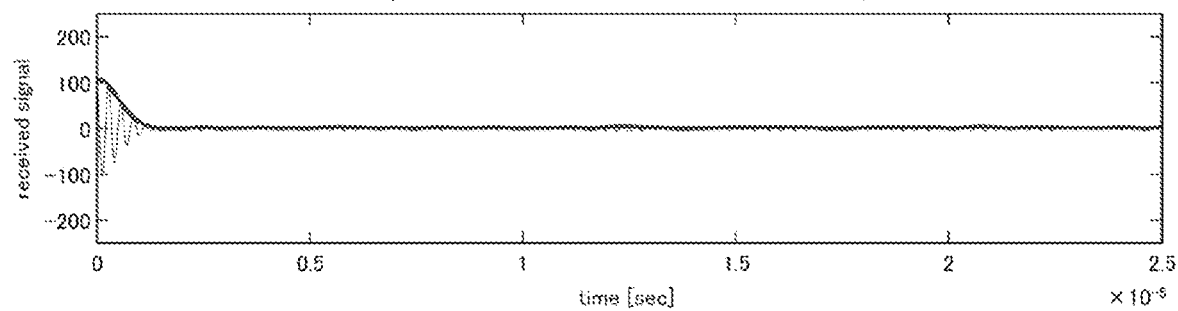
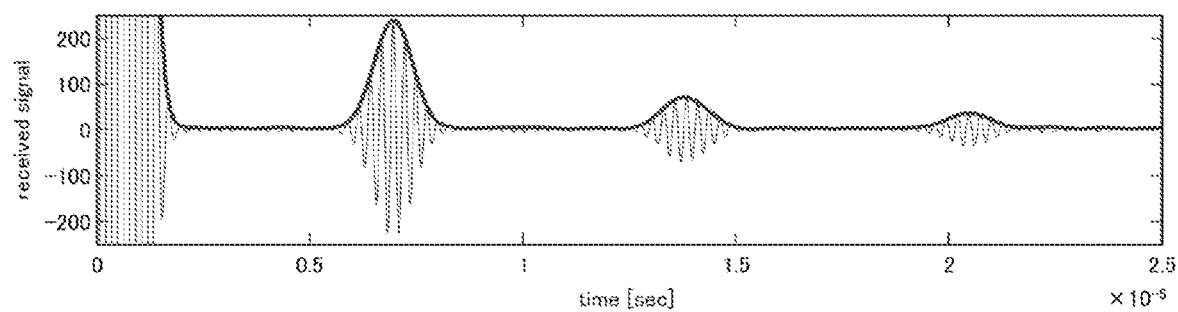

[Fig. 5]
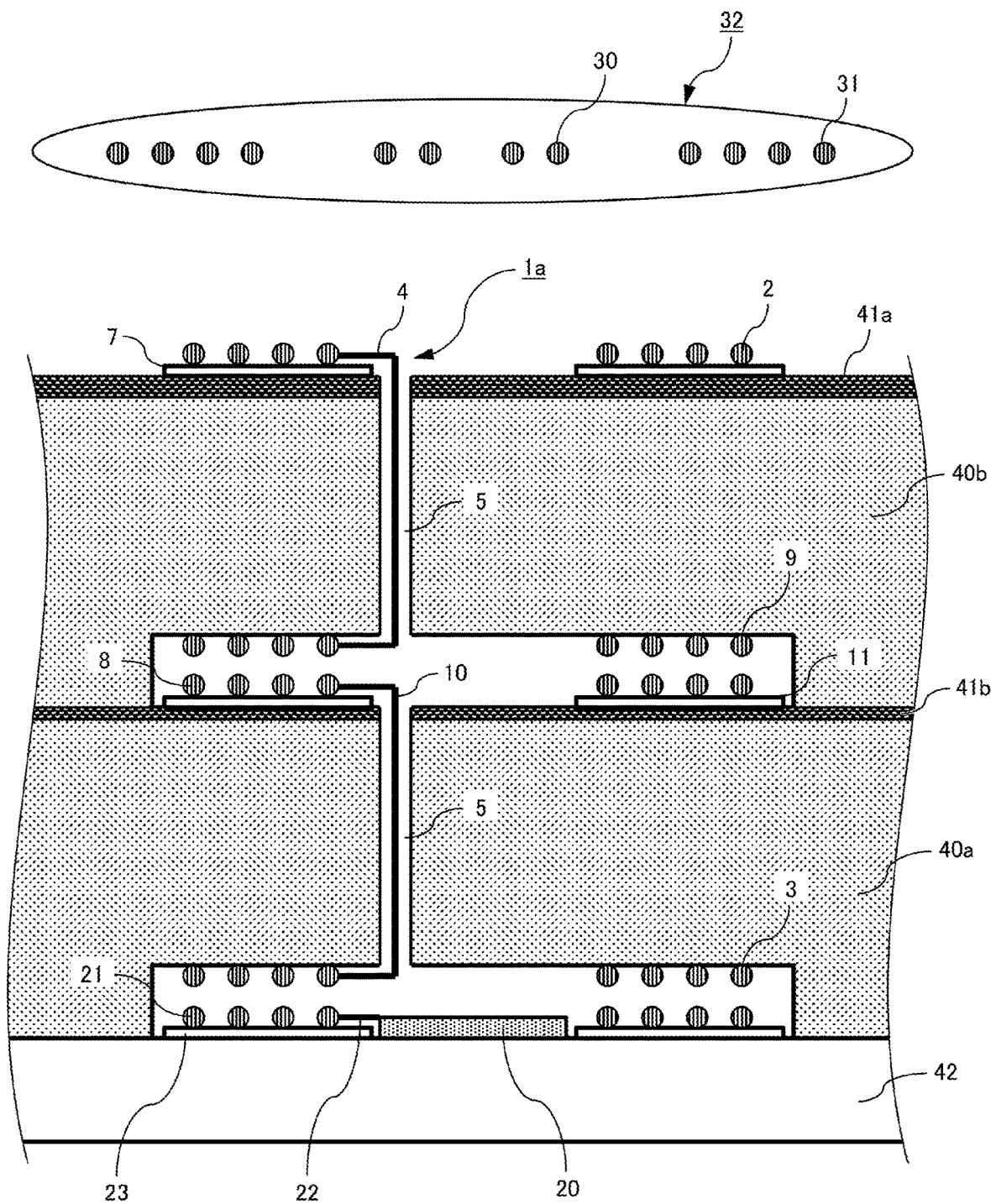

[Fig. 6]
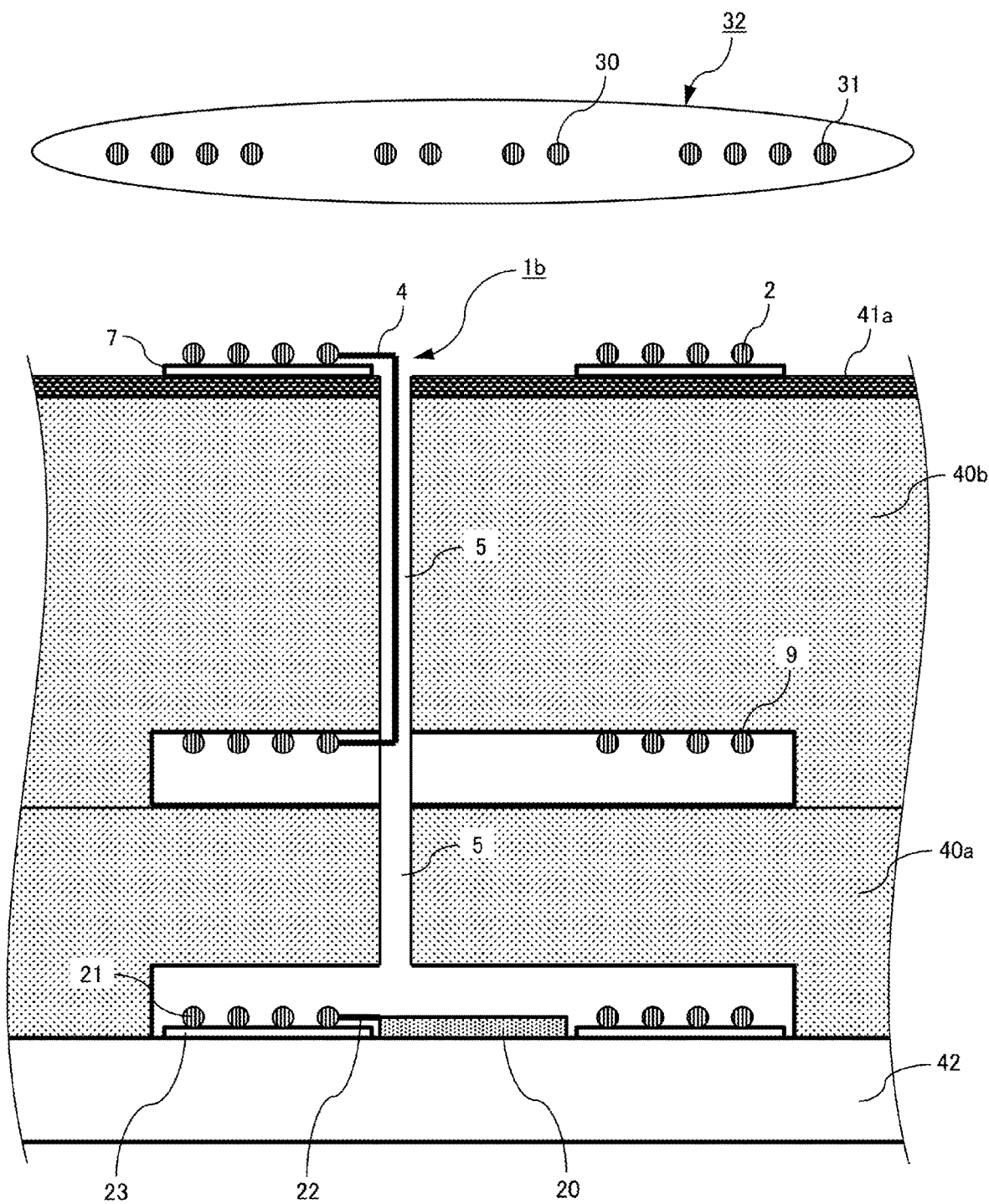

[Fig. 7]
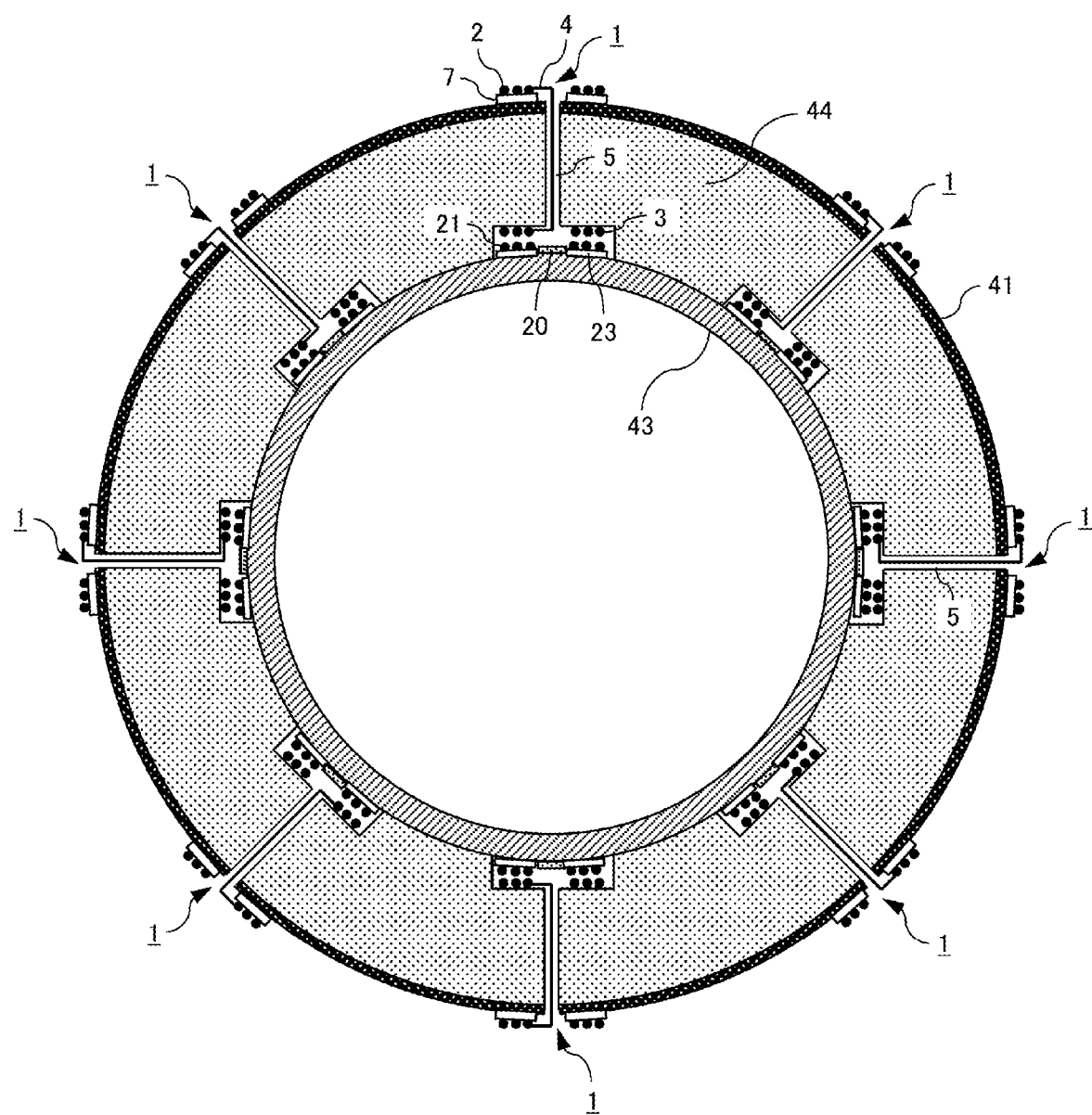

[Fig. 8]
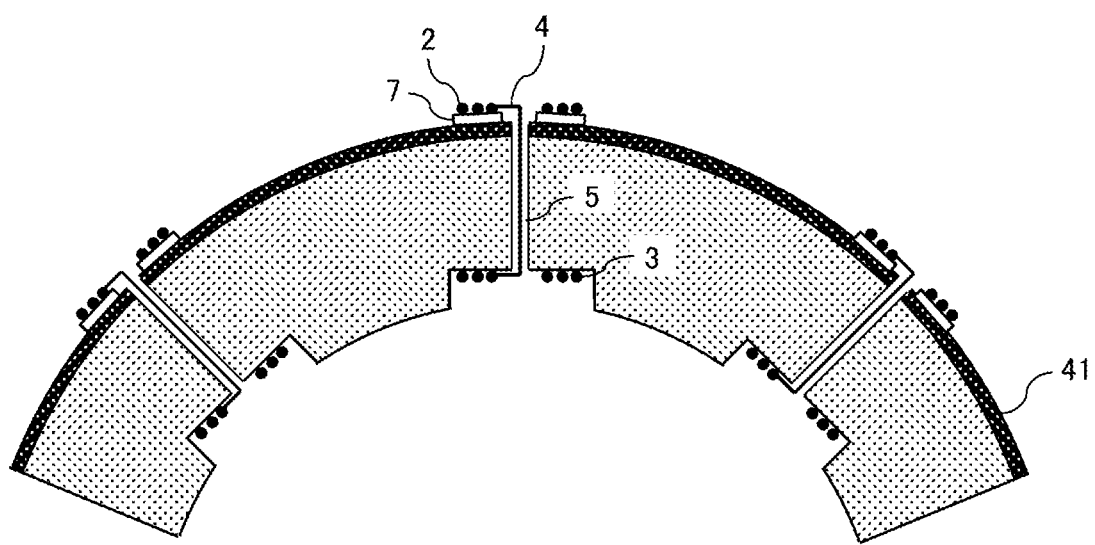

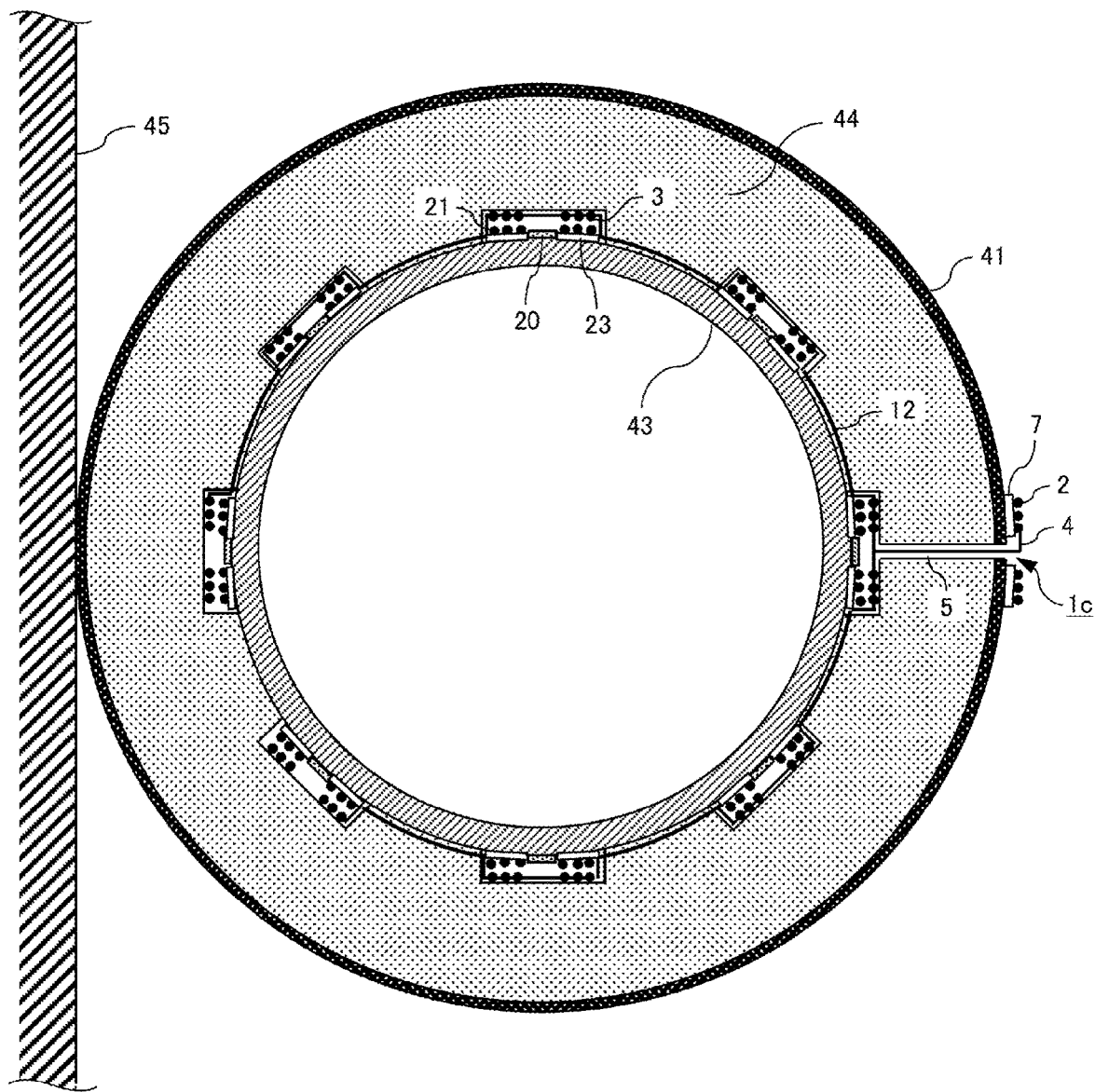
[Fig. 9]

[Fig. 10]
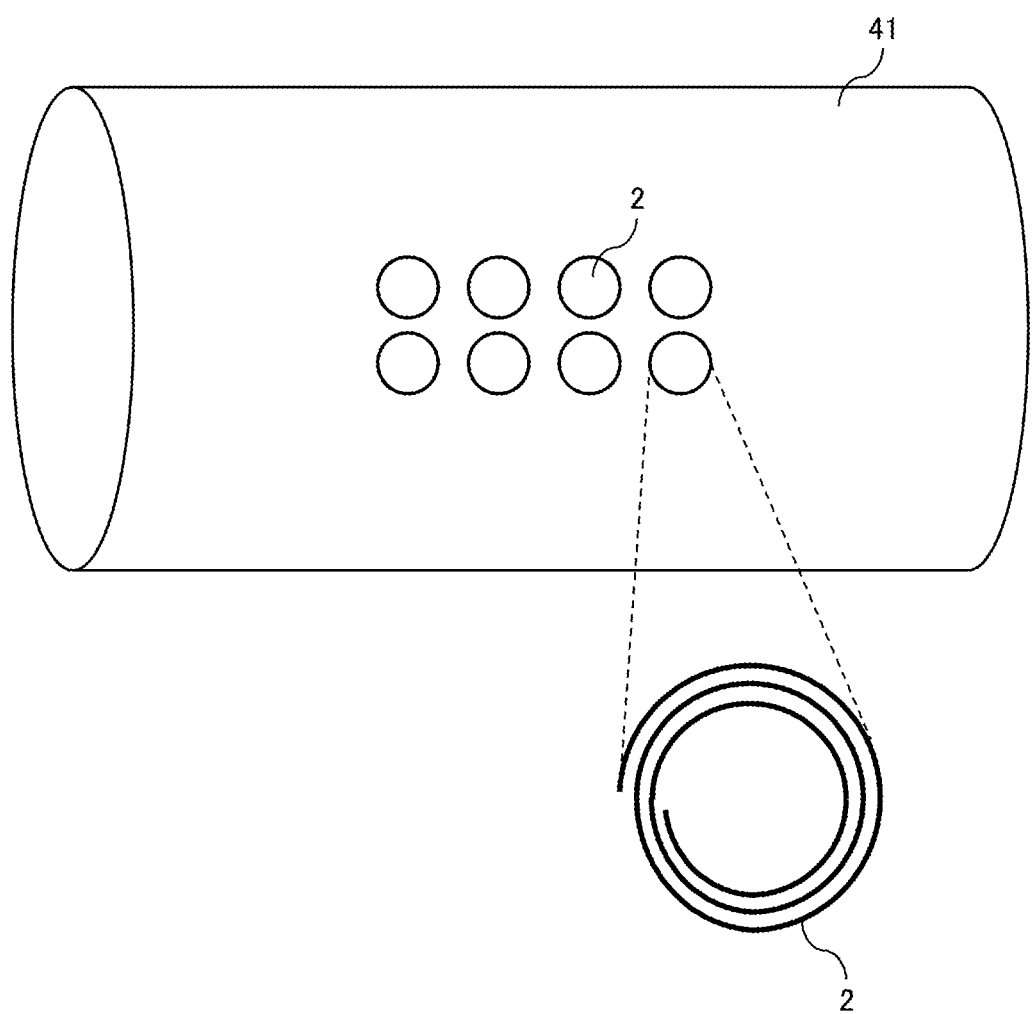

SENSOR SYSTEM

TECHNICAL FIELD

The present invention relates to a sensor system suitable for nondestructive inspection using ultrasonic waves.

BACKGROUND ART

A nondestructive inspection technique is a technique capable of inspecting a state of a target object without destroying the target object, and, particularly, nondestructive inspection using ultrasonic waves is used in wide fields due to low cost, easy application, and the like.

In a nuclear power plant or a thermal power plant, crack inspection or thickness inspection using ultrasonic waves is periodically performed in order to ensure soundness of pipes or containers. Since most of the pipes or the containers are covered with heat insulating members, first, the heat insulating member is detached in order to perform ultrasonic inspection, an ultrasonic probe is manually pressed against a predefined inspection point, and then the heating insulating members are required to be recovered. If an inspection location is high, scaffold assembling is necessary before and after inspection.

Particularly, in a nuclear power plant, a plurality of pipes and containers are defined to be inspected for each periodic inspection, and thus a lot of labor and time are necessary. In the above-described manual inspection, a signal which is received by the ultrasonic probe changes depending on a pressing angle of the ultrasonic probe, and thus the ultrasonic probe is required to be carefully controlled for each inspection point.

In order to solve this problem, for example, as disclosed in NPL 1 or NPL 2, there is a method in which an ultrasonic sensor provided with a battery and a control electric wave transceiver is attached to an inspection point in advance. If a control server and a control electric wave transmitter are disposed in a plant, each ultrasonic sensor is controlled from the control server during inspection, and ultrasonic inspection at each inspection point can be automatically performed. The ultrasonic sensor is attached under a heat insulating member in advance, and thus ultrasonic inspection can be performed on pipes or containers without attachment and detachment of the heat insulating member. However, in this method, a battery and a control electric wave transceiver are required to be provided in an ultrasonic sensor, and thus periodic maintenance such as exchanging of batteries is necessary. There is also a problem in that a sensor becomes large-sized.

NPL 3 discloses an inspection method using an ultrasonic optical probe obtained by combining an electromagnetic ultrasonic transducer with an optical fiber sensor. A resonance wave of an ultrasonic wave excited by the electromagnetic ultrasonic transducer is detected by the optical fiber sensor. The electromagnetic ultrasonic transducer and the optical fiber sensor are provided at an inspection point under a heat insulating member in advance, and thus ultrasonic inspection for pipes can be performed without attachment and detachment of the heat insulating member. However, a plurality of wires are necessary in order to extract power lines or signal lines from respective electromagnetic ultrasonic transducers and optical fiber sensors, and thus the risk of disconnection increases. In a case where a crack or a thickness reduction is detected in a pipe by the sensor, the heat insulating member is detached, and manual detailed inspection is required to be performed, but power lines or signal lines of the sensor are extracted to the outside through the heat insulating member. Therefore, when the heat insulating member is detached, it is necessary to cut the power lines or the signal lines, and thus there is a problem in that a sensor of a portion not requiring detailed inspection cannot also be used.

PTL 1 discloses a sensor system which includes a sensor provided on a surface of a metal structure which is an inspection target in advance, a transducer coil which is disposed outside the sensor, and an electromagnetic interference (EMI) absorbing layer disposed between the sensor and the surface of the metal structure which is an inspection target, and performs transmission and reception of information with the sensor via the transducer coil through electromagnetic induction coupling with a transmission coil forming a probe coil. In this method, a sensor portion is formed of only the sensor and the transducer coil, and thus a battery is not necessary. Therefore, this method is a promising technique since the sensor portion is free of maintenance.

CITATION LIST

Patent Literature

PTL 1: GB2523266A

Non-Patent Literature

NPL 1: S. Jang, et. al, Structural health monitoring of a cable-stayed bridge using smart sensor technology: Deployment and evaluation, Smart Structures and Systems, Vol. 6, No. 5 and 6 (2010) pp. 439 to 459

NPL 2: F. Cegla, J. Allin, Ultrasonic monitoring of pipeline wall thickness with autonomous, wireless sensor networks, Oil and Gas Pilelines: Integrity and Safety Handbook (2015)

NPL 3: YAMAGA, TAKAHASHI, AHIKO, "Thickness Measuring Technology for Pipes of Thermal Power Plants" Toshiba Review Vol. 63, No. 4 (2008) pp. 41 to 44

NPL 4: C. Zhong, A. Croxford, P. Wilcox, Investigation of Inductively Coupled Ultrasonic Transducer System for NDE, IEEE transactions on ultrasonics, Vol. 60, No. 6 (2013) pp. 1115 to 1125

SUMMARY OF INVENTION

Technical Problem

In a nuclear power plant, a plurality of pipes and containers are required to be periodically inspected. Particularly, in pipe thickness reduction inspection, inspection methods recommended by The Japan Society of Mechanical Engineers are defined, and, above all, a measurement pitch on a pipe surface is required to be equal to or less than 100 mm. According to this standard, since a plurality of sensors are attached to the pipe surface, it is important that the sensors are free of maintenance and are compact. The inspection method using electromagnetic induction between coils disclosed in PTL 1 may be more effective than the inspection methods disclosed in NPLs 1, 2 and 3, since the sensor portion is free of maintenance and is also compact.

On the other hand, a heat insulating member of a plant pipe is generally formed of a nonmetallic heat insulating portion having a heat insulating function and a metallic exterior material for holding the heat insulating portion. The heat insulating portion is formed of a nonmetallic member of calcium silicate or the like, and a thickness (a thickness in a diameter direction) thereof is, for example, a maximum of 90 mm. In this case, in the configuration disclosed in PTL 1, an outer diameter of the transducer coil disposed outside the sensor is necessarily 90 mm to 100 mm, and thus the configuration cannot cope with the above-described standard in which a measurement pitch is equal to or less than 100 mm. In other words, in the configuration disclosed in PTL 1, there is concern that signals from transducer coils adjacent to each other may be received.

Therefore, the present invention provides a sensor system which can detect a thickness reduction, a crack, or the like of a pipe or a container covered with a thick coating member through ultrasonic inspection without attachment and detachment of the coating member.

Solution to Problem

In order to solve the problem, according to the present invention, there is provided a sensor system used for non-destructive inspection, including a sensor attached to a surface of an inspection target; a sensor coil that is electrically connected to the sensor via a first cable; a first electromagnetic wave blocking member that is disposed between the surface of the inspection target and the sensor coil; a sensor side coil that is disposed to face the sensor coil with a gap and is capable of being coupled to the sensor coil through electromagnetic induction; and a probe side coil that is disposed to be separated from the sensor side coil and is electrically connected to the sensor side coil via a second cable.

Advantageous Effects of Invention

According to the present invention, it is possible to provide a sensor system which can detect a thickness reduction, a crack, or the like of a pipe or a container covered with a thick coating member through ultrasonic inspection without attachment and detachment of the coating member.

Objects, configurations, and effects other than those described above will become apparent through description of the following embodiments.

BRIEF DESCRIPTION OF DRAWINGS

FIG. 1 is the entire schematic configuration diagram of a sensor system of Example 1 related to one embodiment of the present invention.

FIG. 2 is a diagram illustrating shapes of various coils forming the sensor system illustrated in FIG. 1.

FIG. 3 is a diagram illustrating an electric circuit configuration of the sensor system illustrated in FIG. 1.

FIG. 4 is a diagram illustrating comparison between a signal reception waveform obtained according to a well-known technique and a signal reception waveform obtained by the sensor system of Example 1.

FIG. 5 is the entire schematic configuration diagram of a sensor system of Example 2 related to another embodiment of the present invention.

FIG. 6 is the entire schematic configuration diagram illustrating a modification example of the sensor system illustrated in FIG. 5.

FIG. 7 is the entire schematic configuration diagram of a sensor system of Example 3 related to still another embodiment of the present invention.

FIG. 8 is a diagram illustrating a method of building the sensor system illustrated in FIG. 7 into a heat insulating member (coating member).

FIG. 9 is the entire schematic configuration diagram of a sensor system of Example 4 related to still another embodiment of the present invention.

FIG. 10 is a diagram illustrating arrangement of a probe side coil in a metallic exterior member of the sensor system illustrated in FIG. 9.

DESCRIPTION OF EMBODIMENTS

In the present specification, a "coating member covering an inspection target" is, for example, a heat insulating member or a concrete member. As the heat insulating member, a calcium silicate heat insulating member, a rock wool heat insulating member, a glass wool heat insulating member, an amorphous water-kneaded heat insulating member, a rigid urethane foam heat insulating member, or the like is used.

In the present specification, an "exterior member" is a member covering an outer surface of a coating member covering an inspection target, and, in a case where the coating member is a heat insulating member, a metallic exterior member or a resin exterior member is used. On the other hand, in a case where the coating member is a concrete member, an exterior member covering an outer surface of the coating member which is a concrete member is not necessarily provided. Therefore, in a case where an exterior member is a metallic exterior member, an electromagnetic wave blocking member (second electromagnetic wave blocking member) is provided between a surface of the metallic exterior member and a probe side coil in order to prevent the influence of an eddy current. On the other hand, in a case where an exterior member is a resin exterior member, or a coating member is a concrete member, it is not necessary to provide an electromagnetic wave blocking member (second electromagnetic wave blocking member) between a surface of the resin exterior member or the concrete coating member and the probe side coil.

Hereinafter, as an example, a description will be made of a case where a coating member is a heat insulating member, and an exterior member covering an outer surface of the heat insulating member is a metallic exterior member, needless to say, this is only an example.

Hereinafter, embodiments of the present invention will be described with reference to the drawings.

Example 1

FIG. 1 is the entire schematic configuration diagram of a sensor system of Example 1 related to one embodiment of the present invention, and FIG. 2 is a diagram illustrating shapes of various coils forming the sensor system illustrated in FIG. 1.

As illustrated in FIG. 1, a sensor system. 1 includes a sensor 20 adhered to a surface of an inspection target 42, a sensor coil 21 electrically connected to the sensor 20 via a first cable 22, and a first electromagnetic wave blocking member 23 disposed between the surface of the inspection target 42 and the sensor coil 21. The sensor system 1 further includes a sensor side coil 3 which is disposed to face the sensor coil 21 with a gap and is coupled thereto through electromagnetic induction, a probe side coil 2 which is disposed to be separated from the sensor side coil 3 and is electrically connected thereto via a second cable 4, and a second electromagnetic wave blocking member 7 which is disposed between a surface of a metallic exterior member 41 as an exterior member and the probe side coil 2, in which a circuit element 6 is provided between the probe side coil 2 and the sensor side coil 3 without contact with a surface of the metallic exterior member 41 over the surface of the metallic exterior member 41.

The sensor system 1 performs transmission and reception of information with a sensor probe 32 formed of a transmission coil 31 and a reception coil 30. A gap between the sensor coil 21 and the sensor side coil 3 is preferably as small as possible. However, this is only an example, and a gap between the sensor coil 21 and the sensor side coil 3 may be large. In other words, a gap between the sensor coil 21 and the sensor side coil 3 is arbitrarily set as appropriate.

The inspection target 42 in the present example is a metal plate made of carbon steel or stainless steel, and corresponds to a pipe or a container having a large curvature in plant inspection. The inspection target 42 is heated during plant operation, and is thus covered with a heat insulating member which is the coating member 40 as a calcium silicate heat insulating member (or a rock wool heat insulating member, a glass wool heat insulating member, an amorphous water-kneaded heat insulating member, a rigid urethane foam heat insulating member, or the like). The metallic exterior member 41 made of aluminum (or formed of a galvanized steel sheet) for holding the heat insulating member is provided around the heat insulating member which is the coating member 40. The transmission coil 31 and the reception coil 30 forming the sensor probe 32 are connected to a personal computer (PC) (not illustrated) having functions of a pulse receiver (not illustrated) and an oscilloscope used for normal ultrasonic inspection. A penetration hole 5 which penetrates toward the sensor 20 side is formed in the metallic exterior member 41 and the heat insulating member which is the coating member 40 so that the second cable 4 electrically connecting the probe side coil 2 and the sensor side coil 3 to each other can be inserted thereinto. The sensor side coil 3 is disposed on an inner surface of the heat insulating member which is the coating member 40.

As illustrated in FIG. 2, the probe side coil 2 and the sensor side coil 3 forming the sensor system 1 are formed in a swirl shape or a spiral shape, and each thereof is, for example, a flat coil formed of a copper line of 0.05 mm. The reception coil 30 forming the sensor probe 32 is disposed inside the transmission coil 31 in a plan view, and is formed in a swirl shape or a spiral shape. Each of the reception coil 30 and the transmission coil 31 is, for example, a flat coil formed of a copper line of 0.05 mm.

FIG. 3 is a diagram illustrating an electric circuit configuration of the sensor system illustrated in FIG. 1. Sizes and the number of turns of the probe side coil 2 and the sensor side coil 3 forming the sensor system 1, and the reception coil 30 and the transmission coil 31 forming the sensor probe 32 are determined according to an electric circuit model illustrated in FIG. 3. This electric circuit model is derived for the first time in the present invention by taking into consideration the constituent elements illustrated in FIG. 1. If a size and the number of turns of each coil are changed, resistance R, capacitance C, and inductance L of each coil are changed. Mutual inductance M between the coils is changed according to the sizes of the respective coils and relative positions therebetween. Mutual inductance $M_{12}$ between the transmission coil 31 forming the sensor probe 32 and the probe side coil 2 forming the sensor system 1, mutual inductance $M_{23}$ between the reception coil 30 forming the sensor probe 32 and the probe side coil 2 forming the sensor system 1, and mutual inductance $M_{45}$ between the sensor side coil 3 and the sensor coil 21 forming the sensor system 1 are changed. Therefore, these are taken into consideration, and then sizes and the number of turns of the coils causing an output voltage $V_3$ to be the optimum for an input voltage $V_1$ are determined.

As an outer diameter of the coil increases, a signal to noise ratio (SN ratio) of a signal received by the receiver is improved, but, as described above, a measurement pitch of 100 mm or less is required in pipe thickness reduction inspection. Therefore, in the present example, each of outer diameters of the probe side coil 2, the sensor side coil 3, and the sensor coil 21 forming the sensor system 1 is set to 30 mm by taking into consideration interference between adjacent sensor coils 21. Outer diameters of the transmission coil 31 and the reception coil 30 forming the sensor probe 32 are respectively set to 53 mm and 46 mm by taking into consideration an SN ratio and interference between adjacent coils. The outer diameter dimensions of the coils are not limited to these dimensions, and are set as appropriate depending on a shape of the inspection target 42, a required SN ratio, and the like.

If a frequency used for ultrasonic inspection is increased, the number of turns of a coil is reduced, and thus it is difficult to design an electric circuit by using only the number of turns. In order to solve this problem, the circuit element 6 is provided between the probe side coil 2 and the sensor side coil 3. The circuit element 6 is formed of, for example, a capacitor and/or a resistor. Generally, the circuit element 6 is hardly used under a high temperature environment. Therefore, in the present example, the circuit element 6 is provided outside the metallic exterior member 41 which is hardly influenced by the temperature of the inspection target 42 heated during plant operation. In other words, the circuit element 6 is provided not to be in contact with a surface of the metallic exterior member 41 over the surface of the metallic exterior member 41.

An electrical signal corresponding to a transmission wave generated by a pulser (not illustrated) is converted into a magnetic field due to electromagnetic induction in the transmission coil 31 forming the sensor probe 32, so as to be received by the probe side coil 2 forming the sensor system 1. In order to prevent a magnetic field formed by the transmission coil 31 from disappearing as an eddy current on the surface of the metallic exterior member 41, the second electromagnetic wave blocking member 7 is provided between the probe side coil 2 and the metallic exterior member 41. As an electromagnetic wave blocking member, for example, an electromagnetic wave blocking sheet of EMI Absorber AB Series manufactured by 3M Company, USA is used. A thickness of the electromagnetic wave blocking sheet is 0.2 to 0.5 mm in order to exhibit sufficient blocking performance, but a thicker electromagnetic wave blocking sheet may be used. The electrical signal received by the probe side coil 2 forming the sensor system 1 via the magnetic field is sent to the sensor side coil 3 via the second cable 4. The electrical signal is sent to the sensor coil 21 via a magnetic field formed due to electromagnetic induction in the sensor side coil 3. In the same manner as in the above-described probe side coil 2, in order to suppress an eddy current formed on the surface of the inspection target 42, the first electromagnetic wave blocking member 23 is provided between the sensor coil 21 and the inspection target 42. A material, a thickness, and the like thereof may be the same as those of the second electromagnetic wave blocking member 7.

A piezoelectric element is used for the sensor 20 in order to generate an ultrasonic wave. A size of the piezoelectric element is determined according to a frequency of an ultrasonic wave to be used, but, in the present example, an outer diameter thereof is 10 mm, and a thickness thereof is 0.6 mm. As a material of the piezoelectric element to be used, for example, NCE51 manufactured by Noliac Company, Denmark is used. In the present example, the sensor 20 is provided with a piezoelectric element in order to generate an ultrasonic wave, but is not necessarily limited thereto. As the sensor 20, for example, a strain gauge (or a strain sensor), an electromagnetic sensor, an accelerometer, or a heat sensor may be used. Since the sensor 20 is electrically connected to the sensor coil 21 via the first cable 22, the sensor 20 vibrates due to an electrical signal received by the sensor coil 21, and thus an ultrasonic wave is transmitted into the inspection target 42.

The ultrasonic wave transmitted into the inspection target 42 is reflected at a crack or a bottom of the inspection target 42, and the ultrasonic wave received by the sensor 20 generates an electrical signal in the sensor 20 due to a piezoelectric effect. The electrical signal is sent to the probe side coil 2 via the sensor coil 21, the sensor side coil 3, and the second cable 4. The electrical signal which is converted into a magnetic field in the probe side coil 2 through electromagnetic induction is received by the reception coil 30 forming the sensor probe 32 so as to be displayed on an oscilloscope on the PC via a receiver (not illustrated). An inspector can discriminate the presence or absence of a crack, a thickness reduction amount, and the like in the inspection target 42 on the basis of the displayed waveform, and, thus, in the sensor system 1 of the present example, ultrasonic inspection for the inspection target 42 can be performed without attachment and detachment of the heat insulating member which is the coating member 40 and the metallic exterior member 41.

In a case where the inspection target 42 is located at a high position, a long rod for high position inspection is attached to the sensor probe 32, and thus ultrasonic inspection can be performed without assembling a scaffold. Since the probe side coil 2 is disposed on the metallic exterior member 41 via the second electromagnetic wave blocking member 7 so as to correspond to a position where the sensor 20 is adhered to the inspection target 42 in advance, the inspector can easily visually recognize the sensor, and thus it is not necessary to carefully control an ultrasonic probe (sensor probe 32) for each inspection point, and also to reduce inspection time. As described above, since energy is supplied to the sensor 20 from the sensor probe 32 via a magnetic field in a noncontact manner, the sensor 20 does not require an energy source such as a battery. Thus, the sensor 20 is compact and is free of maintenance. The sensor 20 and the sensor coil 21 adhered to the inspection target 42, and the sensor side coil 3, and the second cable 4, and the probe side coil 2 attached to the heat insulating member which is the coating member 40 are not required to be mechanically coupled to each other. Therefore, when a crack or a thickness reduction is detected by the sensor 20, the heat insulating member can be detached without cutting the second cable 4 even in a case where manual detailed inspection is performed after detaching the heat insulating member which is the coating member 40. Since the sensor side coil 3 and the sensor coil 21 are disposed near each other, that is, a gap between the sensor coil 21 and the sensor side coil 3 is narrow, even in a case where a measurement pitch is small, such as pipe thickness reduction inspection, ultrasonic inspection can be performed without the sensor side coil 3 receiving a signal from the adjacent sensor coil 21.

FIG. 4 is a diagram illustrating comparison between a signal reception waveform obtained according to a well-known technique and a signal reception waveform obtained by the sensor system 1 of the present example. FIG. 4 illustrates test results in a case where a heat insulating member made of calcium silicate is used as the heat insulating member which is the coating member 40, and a thickness thereof is 30 mm.

A graph illustrated on an upper part (the uppermost part in the figure) in FIG. 4 indicates a signal reception waveform (bottom echo) obtained according to the well-known technique (a method of performing ultrasonic inspection is performed in a noncontact manner by using electromagnetic induction between coils) disclosed in NPL 4, and shows a result in a state in which a metallic exterior member for holding the heat insulating member which is the coating member 40 is not provided.

A graph illustrated on an intermediate part (the middle part in the figure) in FIG. 4 indicates a signal reception waveform (bottom echo) obtained according to the well-known technique (a method of performing ultrasonic inspection is performed in a noncontact manner by using electromagnetic induction between coils) disclosed in NPL 4, and shows a result in a state in which a metallic exterior member for holding the heat insulating member which is the coating member 40 is provided.

A graph illustrated on a lower part (the lowermost part in the figure) in FIG. 4 indicates a signal reception waveform (bottom echo) obtained by the sensor system 1 of the present example, and shows a result in a state in which the metallic exterior member 41 for holding the heat insulating member which is the coating member 40 is provided.

As can be seen from FIG. 4, in a case where a metallic exterior member for holding a heat insulating member which is a coating member covering an inspection target is not provided, a signal reception waveform can be obtained even according to the well-known technique. However, in a case where a metallic exterior member for holding a heat insulating member which is a coating member covering an inspection target is provided, if the well-known technique is used, electromagnetic induction between coils is blocked by the metallic exterior member, and thus a signal reception waveform cannot be obtained. In contrast, as illustrated in the lower (the lowermost part in the figure) in FIG. 4, it can be seen that a signal reception waveform can be favorably obtained even in a case where a metallic exterior member for holding a heat insulating member which is a coating member covering an inspection target is provided, by using the sensor system 1 of the present example. This is because the sensor system of the present example is provided with the second electromagnetic wave blocking member 7 disposed between the surface of the metallic exterior member 41 and the probe side coil 2 so that the influence of an eddy current generated on the surface of the metallic exterior member 41 can be prevented, and the sensor side coil 3 which is disposed to face the sensor coil 21 with a gap and is coupled thereto through electromagnetic induction is electrically connected to the probe side coil 2 via the second cable 4.

In the present example, a description has been made of a case where the metallic exterior member 41 is used as an exterior member covering the outer surface of the heat insulating member which is the coating member 40, but this is only an example. For example, in a case where a resin exterior member is used as an exterior member, the second electromagnetic wave blocking member 7 disposed between a surface of the resin exterior member and the probe side coil 2 is not necessary, and thus the probe side coil 2 may be directly disposed on the surface of the resin exterior member.

In the present example, a description has been made of a configuration in which the circuit element 6 is located between the probe side coil 2 and the sensor side coil 3, and is located over the surface of the metallic exterior member 41 without contact with the surface of the metallic exterior member 41, but any other configuration may be used. For example, in a case where a frequency used for ultrasonic inspection is not considerably high, the above-described electric circuit illustrated in FIG. 3 can be designed by using only the number of turns, and thus the circuit element 6 may be omitted.

As mentioned above, according to the present example, it is possible to provide a sensor system which can detect a thickness reduction, a crack, or the like of a pipe or a container covered with a thick coating member through ultrasonic inspection without attachment and detachment of the coating member.

According to the present example, since the probe side coil 2 and the sensor probe 32 are coupled to each other via an electromagnetic induction phenomenon, and thus there is no mechanical connection portion, a long rod for high position inspection is attached to the sensor probe 32, and thus ultrasonic inspection can be performed without assembling a scaffold even in a case where an inspection target is located at a high position.

According to the present example, since the probe side coil 2 is disposed on the metallic exterior member 41 via the second electromagnetic wave blocking member 7 so as to correspond to a position where the sensor 20 is adhered to the inspection target 42 in advance, the inspector can easily visually recognize the sensor, and thus it is not necessary to carefully control an ultrasonic probe (sensor probe 32) for each inspection point, and also to reduce inspection time.

Since energy is supplied to the sensor 20 from the sensor probe 32 via an electromagnetic induction, the sensor 20 is not required to be provided with a battery. Thus, the sensor 20 can be made compact and be made to be free of maintenance.

According to the present example, the sensor coil 21 and the sensor side coil 3 can be disposed near each other, and thus it is possible to suppress interference between the sensor coils 21 adjacent to each other.

Example 2

FIG. 5 is the entire schematic configuration diagram of a sensor system of Example 2 related to another embodiment of the present invention. The present example is different from Example 1 in that a heat insulating member which is a coating member has a structure of two layers which are separate from each other, that is, formed of a first heat insulating member (inner layer side heat insulating member) and a second heat insulating member (outer layer side heat insulating member) covering the first heat insulating member (inner layer side heat insulating member); a second intermediate coil provided on the second heat insulating member (outer layer side heat insulating member) and a first intermediate coil disposed on an outer surface of the first heat insulating member (inner layer side heat insulating member) are provided; and the first intermediate coil is electrically connected to a sensor side coil via a third cable, and the second intermediate coil is electrically connected to a probe side coil via a second cable. The same constituent elements as those in Example 1 are given the same reference numerals.

In a case where the inspection target 42 is heated, and thus a thickness of a heat insulating member which is a coating member is required to be increased, a plurality of separate heat insulating members may be combined with each other from the viewpoint of workability. In this configuration, in a case where attachment and detachment of a heat insulating member are necessary due to detailed inspection or the like, it is preferable that each heat insulating member can be detached separately. The present example assumes such a target.

As illustrated in FIG. 5, a sensor system 1a includes a sensor 20 adhered to a surface of an inspection target 42, a sensor coil 21 electrically connected to the sensor 20 via a first cable 22, and a first electromagnetic wave blocking member 23 disposed between a surface of the inspection target 42 and the sensor coil 21. The sensor system 1a further includes a sensor side coil 3 which is disposed to face the sensor coil 21 with a gap and is coupled thereto through electromagnetic induction, a first intermediate coil 8 which is disposed to be separated from the sensor side coil 3 and is electrically connected thereto via a third cable 10, a second intermediate coil 9 which is disposed to face the first intermediate coil 8 with a gap and is coupled thereto through electromagnetic induction, and a probe side coil 2 which is disposed to be separated from the second intermediate coil 9 and is electrically connected thereto via a second cable 4.

The sensor system 1a performs transmission and reception of information with a sensor probe 32 formed of a transmission coil 31 and a reception coil 30. A gap between the sensor coil 21 and the sensor side coil 3 is preferably as small as possible. However, this is only an example, and a gap between the sensor coil 21 and the sensor side coil 3 may be large. In other words, a gap between the sensor coil 21 and the sensor side coil 3 is arbitrarily set as appropriate.

Since the inspection target 42 assumed in the present example is heated, a heat insulating member which is a coating member has a structure of two layers which are separate from each other, and the inspection target is covered with a first coating member 40a (inner layer side heat insulating member) and a second coating member 40b (outer layer side heat insulating member) covering the first coating member 40a (inner layer side heat insulating member). The second coating member 40b (outer layer side heat insulating member) is covered with a first metallic exterior member 41a (outer layer side exterior member) as an exterior member for holding a shape thereof. The first coating member 40a (inner layer side heat insulating member) is also covered with a second metallic exterior member 41b (inner layer side exterior member) as an exterior member for holding a shape thereof. The sensor system 1a includes a second electromagnetic wave blocking member 7 disposed between a surface of the first metallic exterior member 41a (outer layer side exterior member) and the probe side coil 2, and a third electromagnetic wave blocking member 11 disposed between a surface of the second metallic exterior member 41b (inner layer side exterior member) and the first intermediate coil 8. A penetration hole 5 which penetrates toward the sensor 20 side is formed in the first metallic exterior member 41a (outer layer side exterior member), the second coating member 40b (outer layer side heat insulating member), the second metallic exterior member 41b (inner layer side exterior member), and the first coating member 40a (inner layer side heat insulating member), so that the second cable 4 electrically connecting the probe side coil 2 to the second intermediate coil 9, and the third cable 10 electrically connecting the first intermediate coil 8 to the sensor side coil 3 can be inserted thereinto. The sensor side coil 3 is disposed on an inner surface of the first coating member 40a (inner layer side heat insulating member), and the second intermediate coil 9 is disposed on an inner surface of the second coating member 40b (outer layer side heat insulating member).

An electrical signal corresponding to a transmission wave generated by a pulser (not illustrated) connected to the sensor probe 32 is converted into a magnetic field due to electromagnetic induction in the transmission coil 31 forming the sensor probe 32, so as to be received by the probe side coil 2 forming the sensor system 1a. The electrical signal which is sent to the second intermediate coil 9 via the second cable 4 is converted into a magnetic field through electromagnetic induction in the second intermediate coil 9 so as to be sent to the first intermediate coil 8 via the magnetic field. The electrical signal which is sent to the sensor side coil 3 via the third cable 10 is converted into a magnetic field through electromagnetic induction in the sensor side coil 3 so as to be received by the sensor coil 21 via the magnetic field. Since the sensor 20 is electrically connected to the sensor coil 21 via the first cable 22, the sensor 20 vibrates due to an electrical signal received by the sensor coil 21, and thus an ultrasonic wave is transmitted into the inspection target 42. A structure of the sensor 20 is the same as that in the above Example 1.

The ultrasonic wave transmitted into the inspection target 42 is reflected at a crack or a bottom of the inspection target 42, and the ultrasonic wave received by the sensor 20 generates an electrical signal in the sensor 20 due to a piezoelectric effect. The electrical signal is sent to the first intermediate coil 8 via the sensor coil 21, the sensor side coil 3, and the third cable 10. The electrical signal sent to the first intermediate coil 8 is received by the reception coil 30 forming the sensor probe 32 via the second intermediate coil 9, the second cable 4, and the probe side coil 2. The electrical signal is displayed on an oscilloscope on the PC via a receiver (not illustrated). An inspector can discriminate the presence or absence of a crack, a thickness reduction amount, and the like in the inspection target 42 on the basis of the displayed waveform, and, thus, in the sensor system 1a of the present example, ultrasonic inspection for the inspection target 42 can be performed without attachment and detachment of the first metallic exterior member 41a (outer layer side exterior member), the second coating member 40b (outer layer side heat insulating member), the second metallic exterior member 41b (inner layer side exterior member), and the first coating member 40a (inner layer side heat insulating member).

The sensor coil 21 adhered to the inspection target 42, and the sensor side coil 3, and the third cable 10, the first intermediate coil 8, the second intermediate coil 9, the second cable 4, and the probe side coil 2 attached to the first coating member 40a (inner layer side heat insulating member) are not required to be mechanically coupled to each other. Therefore, the sign of a thickness reduction can be observed, and the first coating member 40a (inner layer side heat insulating member) and the second coating member 40b (outer layer side heat insulating member) can be separately detached without cutting the second cable 4 and the third cable 10 even in a case where manual detailed inspection is performed.

In the present example, a description has been made of a case where the heat insulating member which is a coating member has a structure of two layers which are separate from each other, and the inspection target 42 is covered with the first coating member 40a (inner layer side heat insulating member) and the second coating member 40b (outer layer side heat insulating member) covering the first coating member 40a (inner layer side heat insulating member), but this is only an example, and the sensor system 1a is also applicable to a case where a heat insulating member which is a coating member has a structure of three or more layers which are separate from each other. In this case, intermediate coils and cables electrically connecting coils to each other may be provided to correspond to the number of separate layers of the heat insulating member.

FIG. 6 is the entire schematic configuration diagram illustrating a modification example of the sensor system illustrated in FIG. 5. As illustrated in FIG. 6, a sensor system 1b includes a sensor 20 adhered to a surface of an inspection target 42, a sensor coil 21 electrically connected to the sensor 20 via a first cable 22, and a first electromagnetic wave blocking member 23 disposed between a surface of the inspection target 42 and the sensor coil 21. The sensor system 1b includes a second intermediate coil 9 separated from the sensor coil 21, disposed on an inner surface of a second coating member 40b (outer layer side heat insulating member), and coupled thereto through electromagnetic induction, a probe side coil 2 disposed to be separated from the second intermediate coil 9 and electrically connected thereto via the second cable 4, and a second electromagnetic wave blocking member 7 disposed between a surface of the first metallic exterior member 41a (outer layer side exterior member) and the probe side coil 2.

The sensor system 1b performs transmission and reception of information with a sensor probe 32 formed of a transmission coil 31 and a reception coil 30.

Since the inspection target 42 assumed in the modification example illustrated in FIG. 6 is heated, a heat insulating member which is a coating member has a structure of two layers which are separate from each other, and the inspection target is covered with a first coating member 40a (inner layer side heat insulating member) and a second coating member 40b (outer layer side heat insulating member) covering the first coating member 40a (inner layer side heat insulating member). A thickness of the first coating member 40a (inner layer side heat insulating member) is smaller than a thickness of the second coating member 40b (outer layer side heat insulating member). Unlike the configuration illustrated in FIG. 5, there is a configuration in which an outer surface of the first coating member 40a (inner layer side heat insulating member) is in direct contact with an inner surface of the second coating member 40b (outer layer side heat insulating member) without using the second metallic exterior member 41b (inner layer side exterior member) for holding a shape of the first coating member 40a (inner layer side heat insulating member). A penetration hole 5 which penetrates toward the sensor 20 side is formed in the first metallic exterior member 41a (outer layer side exterior member), the second coating member 40b (outer layer side heat insulating member), and the first coating member 40a (inner layer side heat insulating member), so that the second cable 4 electrically connecting the probe side coil 2 to the second intermediate coil 9 can be inserted thereinto.

Unlike the sensor system 1a illustrated in FIG. 5, the sensor system 1b does not include the third cable 10 electrically connecting the sensor side coil 3, the first intermediate coil 8, and the sensor side coil 3 to the first intermediate coil 8, and the third electromagnetic wave blocking member 11. Thus, an electrical signal corresponding to a transmission wave generated by a pulser (not illustrated) connected to the sensor probe 32 is converted into a magnetic field due to electromagnetic induction in the transmission coil 31 forming the sensor probe 32, so as to be received by the probe side coil 2 forming the sensor system 1b. The electrical signal which is sent to the second intermediate coil 9 via the second cable 4 is converted into a magnetic field through electromagnetic induction in the second intermediate coil 9 so as to be received by the sensor coil 21 via the magnetic field. Since the sensor 20 is electrically connected to the sensor coil 21 via the first cable 22, the sensor 20 vibrates due to an electrical signal received by the sensor coil 21, and thus an ultrasonic wave is transmitted into the inspection target 42. A structure of the sensor 20 is the same as that in the above Example 1.

The ultrasonic wave transmitted into the inspection target 42 is reflected at a crack or a bottom of the inspection target 42, and the ultrasonic wave received by the sensor 20 generates an electrical signal in the sensor 20 due to a piezoelectric effect. The electrical signal is sent to the probe side coil 2 via the sensor coil 21, the second intermediate coil 9, and the second cable 4. The electrical signal sent to the probe side coil 2 is received by the reception coil 30 forming the sensor probe 32 through electromagnetic induction. The electrical signal is displayed on an oscilloscope on the PC via a receiver (not illustrated). An inspector can discriminate the presence or absence of a crack, a thickness reduction amount, and the like in the inspection target 42 on the basis of the displayed waveform, and, thus, in the sensor system 1b, ultrasonic inspection for the inspection target 42 can be performed without attachment and detachment of the first metallic exterior member 41a (outer layer side exterior member), the second coating member 40b (outer layer side heat insulating member), and the first coating member 40a (inner layer side heat insulating member). An electrical signal generated in the sensor 20 is sent to the second intermediate coil 9 via the first coating member 40a (inner layer side heat insulating member) through electromagnetic induction in the sensor coil 21, and thus a thickness of the first coating member 40a (inner layer side heat insulating member) is preferably small. For example, in a case where the entire thickness of a coating member is required to be 90 mm, if the first coating member 40a (inner layer side heat insulating member) which is an inner coating member is made thin, and the second coating member 40b (outer layer side heat insulating member) which is an outer coating member is made thick, workability is improved.

In the present example illustrated in FIG. 5, a description has been made of a case where the first metallic exterior member 41a (outer layer side exterior member) is used as an exterior member covering the outer surface of the second coating member 40b (outer layer side heat insulating member), and the second metallic exterior member 41b (inner layer side exterior member) is used as an exterior member covering the outer surface of the first coating member 40a (inner layer side heat insulating member), but this is only an example. For example, in a case where resin exterior members are used instead of the first metallic exterior member 41a (outer layer side exterior member) and the second metallic exterior member 41b (inner layer side exterior member), the second electromagnetic wave blocking member 7 disposed between a surface of the resin exterior member and the probe side coil 2, and the third electromagnetic wave blocking member 11 disposed between a surface of the resin exterior member and the first intermediate coil 8 are not necessary. Thus, the probe side coil 2 may be directly disposed on the surface of the resin exterior member, and the first intermediate coil 8 may be directly disposed on the surface of the resin exterior member.

Similarly, in the modification example illustrated in FIG. 6, a description has been made of a case where the first metallic exterior member 41a (outer layer side exterior member) is used as an exterior member covering the outer surface of the second coating member 40b (outer layer side heat insulating member), but this is only an example. For example, in a case where a resin exterior member is used instead of the first metallic exterior member 41a (outer layer side exterior member), the second electromagnetic wave blocking member 7 disposed between a surface of the resin exterior member and the probe side coil 2 is not necessary, and thus the probe side coil 2 may be directly disposed on the surface of the resin exterior member.

As mentioned above, according to the present example, in addition to the effect of Example 1, also in a case where an inspection target is heated, and thus a thickness of a heat insulating member which is a coating member is required to be increased, ultrasonic inspection can be performed without attachment and detachment of the coating member.

According to the modification example illustrated in FIG. 6, if the first coating member 40a (inner layer side heat insulating member) which is an inner coating member is made thin, and the second coating member 40b (outer layer side heat insulating member) which is an outer coating member is made thick, workability can be improved.

Example 3

FIG. 7 is the entire schematic configuration diagram of a sensor system of Example 3 related to still another embodiment of the present invention. The present example is different from Example 1 in that an inspection target is a cylindrical metallic pipe, and a plurality of the sensor systems described in Example 1 are disposed to be separated from each other at a predetermined interval in a circumferential direction on a surface of the cylindrical pipe. The same constituent elements as those in Example 1 are given the same reference numerals.

In a nuclear power plant or a thermal power plant, there is a case where a material forming a pipe is worn, and thus a thickness thereof is reduced, due to a fluid (water or steam) flowing through the cylindrical pipe. In pipe thickness reduction inspection, inspection methods recommended by The Japan Society of Mechanical Engineers are defined, and, above all, a measurement pitch on a pipe surface is required to be equal to or less than 100 mm. The present example assumes such an inspection target.

Each of eight sensor systems 1 of the present example includes a sensor 20 adhered to a surface of a cylindrical pipe 43 which is an inspection target, a sensor coil 21 electrically connected to the sensor 20 via a first cable 22 (refer to FIG. 1), a first electromagnetic wave blocking member 23 (refer to FIG. 1) disposed between a surface of the pipe 43 which is an inspection target and the sensor coil 21, a sensor side coil 3 which is disposed to face the sensor coil 21 with a gap and is coupled thereto through electromagnetic induction, a probe side coil 2 which is disposed to be separated from the sensor side coil 3 and is electrically connected thereto via a second cable 4, and a second electromagnetic wave blocking member 7 which is disposed between a surface of a metallic exterior member 41 as an exterior member and the probe side coil 2. The eight sensor systems 1 are provided to be separated from each other at a predetermined interval (the interval of 45° with an axis of the pipe 43 as the center) along a circumferential direction of the pipe 43 which is an inspection target. Each of the eight sensor systems 1 performs transmission and reception of information with a sensor probe 32 (refer to FIG. 1) formed of a transmission coil 31 and a reception coil 30. A gap between the sensor coil 21 and the sensor side coil 3 is preferably as small as possible. However, this is only an example, and a gap between the sensor coil 21 and the sensor side coil 3 may be large. In other words, a gap between the sensor coil 21 and the sensor side coil 3 is arbitrarily set as appropriate.

The pipe 43 which is an inspection target is heated during plant operation, and thus an outer circumferential surface thereof is covered with a heat insulating member 44 (coating member) which is a calcium silicate heat insulating member (or a rock wool heat insulating member, a glass wool heat insulating member, an amorphous water-kneaded heat insulating member, a rigid urethane foam heat insulating member, or the like). The outer circumferential surface of the heat insulating member 44 (coating member) is covered with a metallic exterior member 41 made of aluminum (or formed of a galvanized steel sheet). The sensor side coil 3 is attached to an inner surface of the heat insulating member (coating member), and the probe side coil 2 is adhered onto the second electromagnetic wave blocking member 7 attached to an outer circumferential surface of the metallic exterior member 41. A configuration thereof is the same as that disclosed in the above-described Example 1. A penetration hole 5 which penetrates toward the sensor 20 side is formed in the metallic exterior member 41 and the heat insulating member 44 (coating member) so that the second cable 4 electrically connecting the probe side coil 2 and the sensor side coil 3 to each other can be inserted thereinto. In the same manner as in the above-described Example 1, a circuit element 6 (refer to FIG. 1) is provided in the second cable 4 in order to facilitate electric circuit design.

FIG. 8 is a diagram illustrating a method of building the sensor system illustrated in FIG. 7 into the heat insulating member (coating member). As described above, the sensor side coil 3 is attached to the inner surface of the heat insulating member 44 (coating member), and the probe side coil 2 is adhered onto the second electromagnetic wave blocking member 7 attached to the outer circumferential surface of the metallic exterior member 41. The probe side coil 2 and the sensor side coil 3 are electrically connected to each other via the second cable 4 inserted into the penetration hole 5, and thus are not required to be mechanically coupled to the sensor 20 and the sensor coil 21 on the pipe 43 which is an inspection target. Thus, as illustrated in FIG. 8, the heat insulating member 44 (coating member), the metallic exterior member 41, the sensor side coil 3, the probe side coil 2, and the second cable 4 electrically connecting the probe side coil 2 to the sensor side coil 3 can be manufactured as an integrated structure. Consequently, wire routing or the like due to installation on the spot is not necessary, and thus workability is improved. In pipe thickness reduction inspection, a location where the sign of a thickness reduction is observed is required to be transferred to detailed measurement in which measurement is performed at a measurement pitch of higher density after detaching the heat insulating member 44 (coating member), but, also in this case, in the present example, as illustrated in FIG. 8, the heat insulating member 44 (coating member) can be detached at only a necessary location.

In the present example, a description has been made of a configuration in which eight sensor systems 1 are provided to be separated from each other at a predetermined interval (the interval of 45° with an axis of the pipe 43 as the center) along the circumferential direction of the pipe 43 which is an inspection target, but the number of sensor systems 1 disposed along the circumferential direction of the pipe 43 is not limited thereto, and sensor systems 1 of a desired number within a range satisfying a required measurement pitch are disposed as appropriate.

As described above, according to the present example, in addition to the effect of Example 1, it is possible to improve workability when a plurality of sensor systems 1 are provided on a cylindrical metallic pipe of a nuclear power plant or a thermal power plant.

According to the present example, a heat insulating member (coating member) can be detached at only a necessary location when a location where the sign of a thickness reduction is observed is transferred to detailed measurement.

Example 4

FIG. 9 is the entire schematic configuration diagram of a sensor system of Example 4 related to still another embodiment of the present invention, and FIG. 10 is a diagram illustrating arrangement of a probe side coil in a metallic exterior member of the sensor system illustrated in FIG. 9. The present example is different from Example 1 in that an inspection target is a cylindrical metallic pipe, a plurality of pairs (sets) each having a sensor, a sensor coil electrically connected to the sensor via a first cable, and a sensor side coil disposed to face the sensor coil with a gap and coupled thereto through electromagnetic induction are disposed to be separated from each other at a predetermined interval in a circumferential direction on a surface of the cylindrical pipe, a plurality of fourth cables each of which has one end connected to each sensor side coil are routed in the circumferential direction, and the sensor side coils are connected to a probe side coil via the plurality of fourth cables and a single second cable. The same constituent elements as those in Example 1 are given the same reference numerals.

In the same manner as in the above-described Example 3, the present example assumes pipe thickness reduction inspection in a nuclear power plant or a thermal power plant.

As illustrated in FIG. 9, there is a case where a sufficient space cannot be secured outside the pipe 43 which is an inspection target, and thus the sensor probe 32 (refer to FIG. 1) is hardly handled, since a part of the pipe 43 which is an inspection target is disposed to be in contact with a wall surface 45, or due to a position of a pipe support or the like (not illustrated), depending on a laying position of the pipe 43 which is an inspection target. In the present example, instead of a configuration in which the probe side coil 2 is disposed directly over the sensor coil 21 as in the above-described Example 3 illustrated in FIG. 7, as illustrated in FIG. 9, a configuration is employed in which fourth cables 12 are routed in the circumferential direction, and the probe side coil 2 is disposed at a position (the right side of the pipe 43 in FIG. 9) where a sufficient space can be secured outside the pipe 43 which is an inspection target. For convenience, in FIG. 9, the fourth cables 12 appear to be one, but, actually, seven fourth cables 12 are present so as to correspond to the sensors 20 disposed at seven locations other than the sensor 20 disposed at the position corresponding to the probe side coil 2.

As illustrated in FIG. 9, a sensor system 1c of the present example includes eight sensors 20 which are provided to be separated from each other at a predetermined interval (the interval of 45° with an axis of the pipe 43 as the center) along a circumferential direction on a surface of the cylindrical metallic pipe 43 which is an inspection target. In each of the sensors 20 disposed at the seven locations other than the sensor 20 disposed at the position corresponding to the probe side coil 2, the sensor system includes a sensor coil 21 electrically connected to the sensor 20 via a first cable 22 (refer to FIG. 1), a first electromagnetic wave blocking member 23 (refer to FIG. 1) disposed between a surface of the pipe 43 which is an inspection target and the sensor coil 21, and a sensor side coil 3 which is disposed to face the sensor coil 21 with a gap and is coupled thereto through electromagnetic induction, in which one end of each of the fourth cables 12 is connected to the sensor side coil 3, and the other end thereof is connected to the probe side coil 2. On the other hand, in the sensor 20 (the right side of the pipe 43 in FIG. 9) disposed at the position corresponding to the probe side coil 2, the sensor system includes a sensor coil 21 electrically connected to the sensor 20 via a first cable 22 (refer to FIG. 1), a first electromagnetic wave blocking member 23 (refer to FIG. 1) disposed between a surface of the pipe 43 which is an inspection target and the sensor coil 21, a sensor side coil 3 which is disposed to face the sensor coil 21 with a gap and is coupled thereto through electromagnetic induction, a probe side coil 2 which is disposed to be separated from the sensor side coil 3 and is electrically connected thereto via a second cable 4, and a second electromagnetic wave blocking member 7 which is disposed between a surface of a metallic exterior member 41 as an exterior member and the probe side coil 2.

The pipe 43 which is an inspection target is heated during plant operation, and thus an outer circumferential surface thereof is covered with a heat insulating member 44 (coating member) which is a calcium silicate heat insulating member (or a rock wool heat insulating member, a glass wool heat insulating member, an amorphous water-kneaded heat insulating member, a rigid urethane foam heat insulating member, or the like). The outer circumferential surface of the heat insulating member 44 (coating member) is covered with a metallic exterior member 41 made of aluminum (or formed of a galvanized steel sheet). The sensor side coils 3 disposed at eight locations are attached to an inner surface of the heat insulating member 44 (coating member), and the probe side coil 2 disposed at a single location is adhered onto the second electromagnetic wave blocking member 7 attached to an outer circumferential surface of the metallic exterior member 41. A penetration hole 5 which penetrates toward the sensors 20 sides is formed in the metallic exterior member 41 and the heat insulating member 44 (coating member) so that the second cable 4 electrically connecting the probe side coil 2 and the sensor side coil 3 to each other and the seven fourth cables 12 can be inserted thereinto.

Next, the probe side coil 2 disposed at a single location will be described. FIG. 10 is a side view of the probe side coil 2 in FIG. 9. As illustrated in FIG. 10, eight probe side coils 2 are adhered to the second electromagnetic wave blocking member 7 (not illustrated) on the metallic exterior member 41 of the pipe 43 which is an inspection target. The eight probe side coils 2 are formed in a swirl shape or a spiral shape, and are respectively electrically connected to the sensor side coils 3 disposed at the eight locations via the seven fourth cables 12 and the single second cable 4. An arrangement pitch of the eight probe side coils 2 illustrated in FIG. 10 is preferably 1.5 or more times the outer diameter of the probe side coil 2 in order to avoid the influence between the probe side coils 2 adjacent to each other. Since the eight probe side coils 2 are disposed in the above-described way, each probe side coil 2 can be accessed more easily than in Example 3, and thus it is possible to reduce inspection time. For example, in a case where a sensor probe is mounted on a drone, and accesses the probe side coil 2, the drone is not required to move the whole circumference of the pipe 43 which is an inspection target, and thus inspection can be easily performed. Also in a case where a long rod for high position inspection is attached to the sensor probe 32 (refer to FIG. 1) in order to perform high position inspection, the probe side coils 2 are integrated into a single location, and thus inspection can be easily performed.

As described above, according to the present example, in addition to the effect of Example 1, inspection can be easily performed no matter how a cylindrical metallic pipe of a nuclear power plant or a thermal power plant is laid.

The present invention is not limited to the above-described Examples, and includes various modification examples. The above-described Examples have been described in detail for better understanding of the present invention, and are not limited to including all the above-described configurations. Some configurations of a certain Example may be replaced with configurations of other Examples, and configurations of other Examples may be added to configurations of a certain Example.

REFERENCE SIGNS LIST 1, 1a, 1b, and 1c sensor system
2 probe side coil
3 sensor side coil
4 second cable
5 penetration hole
6 circuit element
7 second electromagnetic wave blocking member
8 first intermediate coil
9 second intermediate coil
10 third cable
11 third electromagnetic wave blocking member
12 fourth cable
20 sensor
21 sensor coil
22 first cable
23 first electromagnetic wave blocking member
30 reception coil
31 transmission coil
32 sensor probe
40 coating member
40a first coating member
40b second coating member
41 metallic exterior member
41a first metallic exterior member
41b second metallic exterior member
42 inspection target
43 pipe
44 heat insulating member
45 wall surface

The invention claimed is:

1. A sensor system used for nondestructive inspection, comprising:
    a sensor attached to a surface of an inspection target;
    a sensor coil that is electrically connected to the sensor via a first cable;
    a first electromagnetic wave blocking member that is disposed between the surface of the inspection target and the sensor coil;
    a sensor side coil that is disposed to face the sensor coil with a gap and is capable of being coupled to the sensor coil through electromagnetic induction; and
    a probe side coil that is disposed to be separated from the sensor side coil and is electrically connected to the sensor side coil via a second cable.

2. The sensor system according to claim 1,
    wherein the sensor side coil, which is disposed to face the sensor coil with a gap, is disposed on an inner surface of a coating member covering the inspection target, and is capable of being coupled to the sensor coil through electromagnetic induction.

3. The sensor system according to claim 2, wherein the probe side coil is electrically connected to the sensor side coil via the second cable inserted into a penetration hole which penetrates to the sensor side through the coating member.

4. The sensor system according to claim 1, wherein the probe side coil is electrically connected to the sensor side coil via the second cable inserted into a penetration hole which penetrates to the sensor side through a coating member covering the inspection target.

5. The sensor system according to claim 3, further comprising:
a first metallic exterior member that covers an outer surface of the coating member; and
a second electromagnetic wave blocking member that is disposed between a surface of the first metallic exterior member and the probe side coil.

6. The sensor system according to claim 4, further comprising:
a first metallic exterior member that covers an outer surface of the coating member; and
a second electromagnetic wave blocking member that is disposed between a surface of the first metallic exterior member and the probe side coil.

7. The sensor system according to claim 5, wherein the coating member includes two independent layers having a first coating member and a second coating member covering an outside of the first coating member,
wherein the sensor system further includes a first metallic exterior member covering an outer surface of the second coating member, a second metallic exterior member covering an outer surface of the first coating member, a first intermediate coil disposed on a surface of the second metallic exterior member via a third electromagnetic wave blocking member, and a second intermediate coil disposed to face the first intermediate coil with a gap on an inner surface of the second coating member and capable of being coupled to the first intermediate coil through electromagnetic induction, and
wherein the probe side coil is electrically connected to the second intermediate coil via the second cable, and the sensor side coil disposed on an inner surface of the first coating member is electrically connected to the first intermediate coil via a third cable.

8. The sensor system according to claim 6, wherein the coating member includes two independent layers having a first coating member and a second coating member covering an outside of the first coating member,
wherein the sensor system further includes a first metallic exterior member covering an outer surface of the second coating member, and
wherein the probe side coil is electrically connected to the sensor side coil disposed on an inner surface of the second coating member via the second cable, and the sensor side coil is coupled to the sensor coil through electromagnetic induction.

9. The sensor system according to claim 5, further comprising:
a circuit element that is provided in a second cable electrically connecting the probe side coil to the sensor side coil and includes a capacitor and/or a resistor.

10. The sensor system according to claim 7, wherein the sensor is a piezoelectric element for generating an ultrasonic wave.

11. The sensor system according to claim 7, wherein the sensor is any one of a strain gauge, a strain sensor, an electromagnetic sensor, an accelerometer, and a heat sensor.

12. The sensor system according to claim 7, wherein the coating member, the first coating member, and the second coating member are any one of a calcium silicate heat insulating member, a rock wool heat insulating member, a glass wool heat insulating member, an amorphous water-kneaded heat insulating member, and a rigid urethane foam heat insulating member.

13. The sensor system according to claim 4, wherein the inspection target is a cylindrical metallic pipe, and
wherein a plurality of the sensors are attached to a surface of the pipe so as to be separated from each other at a predetermined interval in a circumferential direction.

14. The sensor system according to claim 4, wherein the inspection target is a cylindrical metallic pipe, and
wherein a plurality of sets each formed of the sensor, a sensor coil electrically connected to the sensor via the first cable, and a sensor side coil disposed to face the sensor coil with a gap and coupled to the sensor coil through electromagnetic induction are disposed to be separated from each other at a predetermined interval along a circumferential direction on a surface of the pipe; in one of the plurality of sets, the sensor side coil is electrically connected to the probe side coil via the second cable; and, in the other sets, the sensor side coil is electrically connected to the probe side coil via a fourth cable which has one end connected to the sensor side coil and is routed in the circumferential direction.

15. The sensor system according to claim 14, wherein the probe side coils of the number corresponding to the plurality of sets are disposed at a single location on the surface of the pipe, and an arrangement pitch of the probe side coils adjacent to each other is 1.5 or more times the outer diameter of the probe side coil.

16. The sensor system according to claim 8, wherein the sensor is a piezoelectric element for generating an ultrasonic wave.

17. The sensor system according to claim 9, wherein the sensor is a piezoelectric element for generating an ultrasonic wave.

18. The sensor system according to claim 8, wherein the sensor is any one of a strain gauge, a strain sensor, an electromagnetic sensor, an accelerometer, and a heat sensor.

19. The sensor system according to claim 9, wherein the sensor is any one of a strain gauge, a strain sensor, an electromagnetic sensor, an accelerometer, and a heat sensor.

20. The sensor system according to claim 8, wherein the coating member, the first coating member, and the second coating member are any one of a calcium silicate heat insulating member, a rock wool heat insulating member, a glass wool heat insulating member, an amorphous water-kneaded heat insulating member, and a rigid urethane foam heat insulating member.

* * * * *